United States Patent Office 3,390,723
Patented July 2, 1968

3,390,723
METHOD OF PREPARING AND USING A PLUGGING OR DIVERTING AGENT
Wayne F. Hower and James A. Derby, Duncan, Okla., assignors to Halliburton Company, Duncan, Okla., a corporation of Delaware
No Drawing. Filed June 16, 1965, Ser. No. 464,566
11 Claims. (Cl. 166—30)

ABSTRACT OF THE DISCLOSURE

A method of plugging or sealing earth formations using a composition comprising sodium silicate and a finely divided water soluble gum.

---

The present invention relates to a new and improved composition and method for forming a plugging or diverting agent in a well bore and in oil, gas, water or other formations, especially those formations traversed by a well bore.

The present invention particularly relates to a temporary plugging agent or diverting agent formed by a composition comprising water, sodium silicate and a water soluble gum, added in that order, for the purpose of fracturing several formations in a well without the necessity of resetting a packer, for plugging one formation in a well while testing or completing another formation, for temporarily sealing a thief zone or a water zone, for sealing a channel leak between two or more formations, and for use in other well operations wherein it is desired to plug or seal a formation or area.

A variety of gels, gelling materials or gel systems are used in the oil industry to seal off zones during fracturing and workover operations and to plug thief zones for a number of reasons as set forth hereinabove. Hydrocarbon gels, water-in-oil emulsions and water base gels are representative of types of gels or materials used. In some instances, it is preferable for the gel to revert to a relatively thin fluid after a desired time, and in other instances, a more permanent type gel is required.

A water base gelling composition prepared by mixing a natural gum, such as guar gum, with a complexing agent, such as borax, and water has been widely used with considerable success. Mixtures of this type are initially relatively thick liquids that quickly become stiff gels. The very rapid gelling of these mixtures, usually one to three minutes after mixing, has made placement problems difficult. There is therefore a need for a gel system or gelling materials for providing longer gel times and which can be accurately controlled. In particular, a control of the elapsed time as to how long in time a gel will last or retain its stiff, rubbery, jelly-like mass before reverting to a relatively thin fluid is desired.

Another disadvantage of prior art gelling systems is that the pH of the system must be controlled by the addition of an acid or other chemical, usually hydrochloric acid.

It is therefore a primary object of the present invention to provide a new and improved composition and method for forming a plugging or diverting agent which overcomes these disadvantages of prior art gelling systems.

It is another object of the present invention to provide a new and improved composition and method for temporarily plugging or sealing well bores, perforations, earth formations, vugs, channel leaks, thief zones, water zones and the like.

A further object of the present invention is to provide a new and improved plugging or diverting agent from a mixture of water, sodium silicate and a finely divided or powdered water soluble gum.

Another important object of the present invention is to provide a gelling system, wherein a fluid may be introduced into a desired area for plugging or sealing thereof and after sufficient time to permit placement thereof, forms a rubbery, jelly-like mass or stiff gel which will retain its character for a desired period of time.

It has been discovered that a plugging or diverting agent having the desired properties may be prepared by adding predetermined amounts of a water soluble gum to a solution of water and sodium silicate or water glass. The amounts of the chemicals or material may be varied to meet the needs of a particular treating or plugging operation.

The addition of a powdered galactomannan such as guar gum, locust bean gum or the like to a sodium silicate solution prepared from either fresh or salt water has been found to provide a particularly useful composition of the present invention.

The sodium silicate-gum system of the present invention is extremely versatile. Gel times, i.e., the time in which it takes for the composition to go from a relatively thin liquid to a relatively highly viscous material or a rubbery, jelly-like mass, may be controlled by varying the amounts of sodium silicate and/or salt added to the water prior to the addition of the gum, and by varying the quantity of gum used in the system. The stability of the gel or rubbery, jelly-like mass may be controlled by the amount of sodium chloride dissolved in the water used to prepare or form the gelling fluid. Additional control of gel stability may also be obtained by the addition of a relatively small quantity of an oxidizing agent. Ammonium persulfate has been found to be a particularly effective oxidizing agent, but any other suitable oxidizing agent may be used. The ammonium persulfate or other oxidizing agent acts as an internal chemical breaker.

Normally the water, sodium silicate and gum are mixed together or combined at the well site or well head and then pumped or introduced into the well in the desired formation or area. After the composition has been in place in the desired area for a predetermined time, a reaction occurs and the liquid or fluid forms a stiff gel or rubbery, jelly-like mass, thereby plugging or sealing off the desired area.

The rubbery, jelly-like mass will eventually break up or revert to a relatively thin viscosity after a determinable time. If some "breaking" is required, an internal breaker or an external breaker may be used. Internal breakers such as an oxidizing agent are preferable with this particular gelling system.

An external breaker such as hydrochloric acid or other suitable acid may be used when desired. The hydrochloric acid acts as an external breaker, but it is necessary that the acid be made to contact the gel.

An encapsulated acid may also be used as a chemical breaker but this procedure is somewhat expensive. Enzymes, which are sometimes used as internal breakers, are temperature and pH sensitive and although they may be suitable under certain conditions, they are generally not preferred in the instant invention.

A "two stream" procedure, i.e. when the aqueous sodium silicate solution is one stream and the gum is a second stream, may also be used, if desired. In this application, the two streams may be joined or brought together at the well site, well head, down a well bore, or at any point prior to entering the area desired to be plugged or sealed off. For effective results, the gelling composition or fluid must be thoroughly mixed before entering the predetermined area or zone to be plugged.

A number of laboratory tests were conducted which effectively prove the feasibility of using the composition of this invention as a temporary plug or diverting agent.

In order to obtain precise gel times, the pH of the mixing water was adjusted to 7.0 for laboratory tests. It should be understood though that the water usually available in the field has a pH ranging from about 6 to 8. If the pH of the mixing water is adjusted to about 7 prior to adding the sodium silicate, tables can be prepared for field use setting forth accurate gel times or gelation periods. One of the advantages of the present invention is that accurate gel times can be obtained.

EXAMPLE A

Materials used

Gum—a modified natural finely divided or powdered guar gum.
Sodium silicate—a silicate of soda (water glass), Grade No. 33 manufactured by Diamond Alkali Co., containing 1 part sodium oxide and 3.85 parts silica.
Water—fresh water unless otherwise specified.

Procedure

The pH of the mixing water was adjusted to 7.0 prior to adding the desired amount of sodium silicate thereto to obtain the proper reaction rate of gum hydration. To 1000 gallons of mixing water and sodium silicate at 80° F., 240 pounds of gum was added while agitating the fluid. Various amounts of sodium silicate were added to the aqueous gelling solution. A Fann V-G meter was used to record viscosity. The readings observed at 300 r.p.m. were corrected to a number 1.0 spring factor. Dial readings equivalent to apparent viscosity in centipoises, time and temperature, when other than room temperature, were recorded.

In some tests, the amounts of the gum were varied, while in other tests, only the base water was changed in order to evaluate the effect of different types of water at various temperatures.

TABLE I.—DIAL READINGS

| Gallons sodium silicate | 1.0 | 2.0 | 3.0 | 4.3 | 5.0 | 6 |
|---|---|---|---|---|---|---|
| Time, min.: | | | | | | |
| 1 | 42.0 | 15.0 | 1.3 | .0 | .2 | 0 |
| 2 | 182.1 | 33.0 | 28.3 | 13.2 | 9.1 | 1.0 |
| 3 | 300.0 | 124.1 | 55.1 | 43.9 | 16.3 | 2.5 |
| 4 | | 210.6 | 99.2 | 48.9 | 34.1 | 2.5 |
| 5 | | 300.0 | 154.1 | 112.0 | 61.5 | 9.0 |
| 6 | | | 206.0 | 155.0 | 122.8 | 4.0 |
| 7 | | | 258.5 | 191.3 | 157.8 | 6.0 |
| 8 | | | 300.0 | 228.9 | 186.6 | 8.0 |
| 9 | | | | 281.5 | 223.0 | 83.5 |
| 10 | | | | 282.0 | 255.0 | 114.0 |
| 11 | | | | 300.0 | 276.0 | 126.5 |
| 12 | | | | | 285.0 | |
| 13 | | | | | 300.0 | 159.0 |
| 18 | | | | | | 300.0 |

TABLE II.—DIAL READINGS

[Sodium silicate, 2 gallons]

| Pounds gum | 220 | 200 | 80 |
|---|---|---|---|
| Time, min.: | | | |
| 1 | 4.8 | 3.9 | |
| 2 | 14.7 | 17.0 | 1.3 |
| 3 | 49.0 | 24.0 | 1.0 |
| 4 | 134.2 | 98.0 | 3.0 |
| 5 | 197.5 | 157.0 | 7.0 |
| 6 | 238.0 | 204.0 | 3.0 |
| 7 | 262.6 | 227.5 | 12.0 |
| 8 | 276.5 | 241.0 | 21.0 |
| 9 | 300.0 | 258.5 | 22.0 |
| 10 | | 276.5 | 23.0 |
| 12 | | 300.0 | 55.0 |
| 14 | | | 83.0 |
| 16 | | | 90.0 |

TABLE III.—DIAL READINGS

[Sodium silicate, 3.3 gallons]

| | 10% sodium chloride water | Saturated sodium chloride water | 2% calcium chloride water |
|---|---|---|---|
| Time, min.: | | | |
| 1 | 11.2 | 32.5 | 80.1 |
| 2 | 36.5 | 78.8 | |
| 3 | 72.1 | 193.0 | |
| 4 | 144.0 | 300.0 | |
| 5 | 219.0 | | |
| 6 | 300.0 | | |

TABLE IV.—DIAL READINGS

[Water, 10% sodium chloride water; sodium silicate, 2 gallons]

| Pounds of gum | 220 | 200 | 180 | 160 |
|---|---|---|---|---|
| Time, min.: | | | | |
| 1 | 11.2 | 8.9 | 7.1 | 5.7 |
| 2 | 41.5 | 38.2 | 28.2 | 20.8 |
| 3 | 170.0 | 155.0 | 117.5 | 98.5 |
| 4 | 300.0 | 262.0 | 201.0 | 149.0 |
| 5 | | 300.0 | 231.5 | 187.0 |
| 6 | | | 279.5 | 215.0 |
| 7 | | | 300.0 | 262.8 |
| 8 | | | | 274.5 |
| 9 | | | | 290.8 |
| 10 | | | | 289.0 |
| 11 | | | | 293.1 |

TABLE V.—DIAL READINGS

[Water, saturated sodium chloride water; sodium silicate, 2 gallons]

| Pounds of gum | 220 | 200 | 180 | 160 |
|---|---|---|---|---|
| Time, min.: | | | | |
| 1 | 7.8 | 7.0 | 6.0 | 5.2 |
| 2 | 16.5 | 15.3 | 11.0 | 9.2 |
| 3 | 49.5 | 47.0 | 30.0 | 26.0 |
| 4 | 125.0 | 105.0 | 58.5 | 47.5 |
| 5 | 185.0 | 145.0 | 101.5 | 83.5 |
| 6 | 240.0 | 197.0 | 133.0 | 109.0 |
| 7 | 268.0 | 238.0 | | 141.5 |
| 8 | 300.0 | 300.0 | 200.0 | 166.0 |
| 9 | | | 234.5 | 182.0 |
| 10 | | | 293.5 | 239.0 |
| 11 | | | 300.0 | 265.0 |
| 12 | | | | 284.5 |

EXAMPLE B

The water gel solution was prepared similarly as in Example A, using 1000 gallons of water, 3 gallons of sodium silicate and 240 pounds of gum. Gel break tests were conducted using various water solutions and at varying temperatures.

TABLE VI.—DIAL READINGS

[Fresh water]

| Temperature, ° F. | 180 | 160 | 140 | 120 | 100 |
|---|---|---|---|---|---|
| Time, hours: | | | | | |
| .5 | 96.0 | 285.0 | 300.0 | 300.0 | 300.0 |
| 1.0 | 40.2 | 65.1 | 283.2 | 300.0 | 300.0 |
| 2.0 | 38.1 | 58.0 | 227.9 | 300.0 | 300.0 |
| 16.0 | 35.0 | 54.5 | 105.0 | 300.0 | 300.0 |
| 41.0 | 36.0 | 54.0 | 99.0 | 300.0 | 300.0 |
| 47.0 | 31.0 | 53.2 | 79.0 | 300.0 | 300.0 |
| 73.0 | 22.0 | 48.5 | 53.0 | 4.5 | 3.5 |
| 97.0 | 23.5 | 48.5 | 48.7 | | |

TABLE VII.—DIAL READINGS

[7% by weight salt water (NaCl)]

| Temperature, ° F. | 180 | 160 | 140 | 120 | 100 | 80 |
|---|---|---|---|---|---|---|
| Time: | | | | | | |
| 6 hours | 300 | 300 | 300 | 300 | 300 | 300 |
| 4 days | broken | 300 | 300 | 300 | 300 | 300 |
| 60 days | 1 300 | 1 300 | 1 300 | 1 300 | 1 9 | 1 300 |

1 Appeared to be water dilution from condensation in the water bath at all temperatures above 100° F. on the 60-day reading. These samples all broke after cooling to room temperature for 5 hours.

TABLE VIII

[Saturated sodium chloride water]

No gel break noted after 60 days at all temperatures—180, 160, 140, 120, 100 and 80° F.
All dial readings at end of 60 days were 300.

EXAMPLE C

The procedure as outlined in Example A was followed, using 1000 gallons of tap water, 2 gallons of sodium silicate and 240 pounds of gum. This solution was divided into four equal parts so that different amounts of ammonium persulfate could be tested under the same conditions. After the solution started to hydrate, various amounts of ammonium persulfate were added. The gum gelled very rapidly and set to a 300+ Fann V-G meter reading using a No. 1 spring.

TABLE IX.—DIAL READINGS

| Lbs. ammonium persulfate* | 25 | 20 | 15 | 10 |
|---|---|---|---|---|
| Time: | | | | |
| 4 hours | 300.0 | 300.0 | 300.0 | 300.0 |
| 24 hours | 300.0 | 300.0 | 300.0 | 300.0 |
| 48 hours | 174.5 | 190.0 | 245.0 | 285.5 |
| 72 hours | 92.0 | 106.5 | 128.0 | 152.5 |
| 6 days | 28.5 | 32.0 | 30.0 | 51.0 |

*Per 1,000 gallons.

The tests shown hereinabove, indicated that satisfactory gels can be made by adding various amounts of sodium silicate to the water and then adding the water soluble gum. The tests further showed that with constant amounts of the gum, increasing amounts of sodium silicate gave longer rates of gelation and that by maintaining a constant amount of sodium silicate solution, increased rates of gelation were obtained by decreasing the gum content of the finished gel. Additionally, for a given temperature, the long time effectiveness was found to be directly related to the amount of sodium chloride present in the water. Further, ammonium persulfate was shown to be an effective agent to break a gel prepared from a water soluble gum and sodium silicate. Also, there is a trend of extended gel life by using smaller amounts of ammonium persulfate.

In properly carrying out a field job, the following procedure is recommended:

(1) Estimate the amount of finished gel needed.

(2) Determine the amount of chemicals required to permit sufficient time to mix and displace the plugging composition in the desired area.

(3) Ascertain the need for breakers. This depends upon the length of time plugging is desired or required.

(4) Mix sodium silicate in water having an initial pH of 7.0.

(5) Add a suitable amount of gum to the sodium silicate solution and mix well.

(6) Displace the mixture into the desired area.

(7) For best results, allow the gel to remain static 15 minutes after reaching the "in place" status of the treatment before testing to see if the gel will hold the desired pressure.

An example of a typical field job is as follows:

DATA

| | |
|---|---|
| Amount of gel necessary to complete job | 1000 gallons approximately. |
| Bottom hole temperature | 120° F. |
| Time to displace gelling material | 6 minutes. |
| Necessary life of gel | 2 days. |
| Gelling materials | 240 pounds of guar gum. 3 gallons of sodium silicate. |
| Maximum time allowed for mixing and pumping | 8 minutes. |
| Breaker | 10 pounds of ammonium persulfate. |

Procedure (1) Assemble all mechanical equipment at the well and prepare all tanks, pumps, valves, and pipelines to treat the well.

(2) Place 1000 gallons of tap water in a mixing tank or tanks. Adjust the pH of the water to 7.0 if necessary.

(3) Add 3 gallons of sodium silicate solution to the water and mix thoroughly.

(4) Add 240 pounds guar gum to the water solution and disperse with a pump or paddle for 1 minute.

(5) Add 10 pounds of ammonium persulfate to the gelling material while fluid is being agitated. Disperse completely for 1 minute.

(6) Immediately displace the gelling material into the formation and shut in the well.

(7) Wait 15 minutes before testing to determine whether the gel will hold the desired pressure.

In the preferred form of the invention, sodium silicate is used in an amount of about one-half gallon to about ten gallons per thousand gallons of water. Greater amounts of sodium silicate may be desirable under certain circumstances.

The gum is added preferably in amounts ranging from about two percent to about three percent by weight. Greater or lesser amounts may be used as particular situations may warrant.

Multiple treatments may be necessary to obtain a desired result. Lost circulation materials, either temporary or permanent may also be beneficial additives in the gel in some instances.

Broadly, the present invention relates to a new and improved composition or material comprising a water soluble gum and sodium silicate and method of using same as a temporary plug or diverting material in well operations or other desired operations.

What is claimed is:

1. A method of sealing an opening in a well, earth formation, or the like, comprising the steps of: introducing into the opening an aqueous solution consisting essentially of sodium silicate, water and a water soluble gum as the gelling ingredients, said solution being prepared by first mixing sodium silicate and water to form an aqueous sodium silicate solution and subsequently adding a quantity of a water soluble gum thereto, and allowing the solution to set into a stiff, jelly-like mass, thereby sealing the opening.

2. The method of claim 1, wherein the water soluble gum is guar gum.

3. A method of temporarily plugging or sealing an opening in a well, earth formation and the like, comprising the steps of: introducing into the opening an aqueous solution consisting essentially of sodium silicate, water, a finely divided galactomannan gum, and an internal chemical breaker; allowing the solution to set into a rubbery, jelly-like mass thereby sealing the opening; and after a predetermined time, allowing the internal chemical breaker to cause the mass to revert to a relatively thin fluid and then removing the fluid from the opening.

4. The method of claim 3, wherein the gum is guar gum.

5. The method of claim 3, wherein the oxidizing agent is ammonium persulfate.

6. A method of temporarily plugging or sealing a well formation, fracture, thief zone, water zone, channel leak or the like, comprising the steps of: introducing into a well in a predetermined area a fluid composition prepared by first mixing sodium silicate and water to form an aqueous sodium silicate solution and subsequently adding a quantity of galactomannan thereto; allowing the fluid composition to set into a stiff jelly-like mass in the predetermined area; and after a desired time, causing the jelly-like mass to revert to a relatively thin fluid and be removed from the predetermined area.

7. The method of claim 6 wherein the galactomannan is a guar gum.

8. The method of claim 6, wherein an oxidizing agent is added to the fluid composition as an internal breaker.

9. A method of preparing a gelling composition consisting essentially of sodium silicate, water and a water soluble gum as the gelling ingredients for a plugging or diverting agent, comprising the steps of: mixing from about ½ gallon to about 10 gallons of sodium silicate to about 1,000 gallons of water, thereby forming an aqueous sodium silicate solution; adding to said aqueous sodium silicate solution from about 2% to about 3% by weight of solution of a finely divided water soluble gum, thereby forming an aqueous gum-silicate solution having a pumpable consistency.

10. The method of claim 9 wherein the water soluble gum is guar gum.

11. The method of claim 10, wherein ammonium persulfate is added to the solution in an amount ranging from about 10 pounds per 1000 gallons of solution to about 25 pounds per 1000 gallons of solution.

References Cited

UNITED STATES PATENTS

| | | | |
|---|---|---|---|
| 789,607 | 5/1905 | Grote | 106—80 |
| 2,181,811 | 11/1939 | Hughes | 106—80 |
| 2,208,766 | 7/1940 | Lawton | 106—80 |
| 2,309,478 | 4/1941 | Amberson | 106—80 |
| 2,317,436 | 4/1943 | Boller et al. | 106—80 X |
| 3,146,200 | 9/1964 | Goldstein et al. | 252—8.5 |
| 3,167,510 | 1/1965 | Alter | 252—8.55 |
| 3,198,268 | 8/1965 | Lindblom et al. | |
| 3,202,214 | 8/1965 | McLaughlin | 166—30 |
| 3,251,768 | 5/1966 | Walker | 252—8.5 |
| 2,158,025 | 5/1939 | Van Hulst et al. | 61—36 |
| 2,229,177 | 1/1941 | Kennedy et al. | 166—32 |
| 2,233,872 | 3/1941 | Proctor | 61—36 |
| 2,876,841 | 3/1959 | Ryan | 166—31 |

STEPHEN J. NOVOSAD, *Primary Examiner.*